United States Patent [19]

Sugiyama

[11] 4,223,231
[45] Sep. 16, 1980

[54] LIQUID LEVEL MONITOR APPARATUS

[76] Inventor: Hajime Sugiyama, No. 3, 2 Banchi, Aza Itchota, Tosaki-Cho, Okazaki, Japan

[21] Appl. No.: 927,163

[22] Filed: Jul. 24, 1978

[30] Foreign Application Priority Data

Sep. 17, 1977 [JP] Japan .................. 52-111930

[51] Int. Cl.³ ............................. G01N 15/06
[52] U.S. Cl. .................. 250/577; 128/214 E
[58] Field of Search ........... 250/577; 128/214 E; 73/293

[56] References Cited

U.S. PATENT DOCUMENTS

| | | | |
|---|---|---|---|
| 2,625,658 | 1/1953 | Robinson | 250/577 |
| 3,105,490 | 10/1963 | Schoenfeld | 128/214 E |
| 3,851,181 | 11/1974 | Heule | 250/577 |

Primary Examiner—David C. Nelms
Assistant Examiner—Darwin R. Hostetter
Attorney, Agent, or Firm—Haseltine, Lake & Waters

[57] ABSTRACT

An apparatus for monitoring and detecting a preselected liquid level of a liquid in a container comprises a light emitter element disposed at a height along the outer wall of the liquid container and a light sensitive element disposed in opposition to the light emitter element at such a height that the light beam emitted from the light emitter element will impinge onto the light sensitive element when the liquid level in the container has attained the preselected liquid level, wherein change in the output state of the light sensitive element is utilized for producing an alarm signal.

6 Claims, 9 Drawing Figures

LIQUID LEVEL MONITOR APPARATUS

BACKGROUND OF THE INVENTION

The present invention relates to an apparatus for detecting a liquid level in a container. In particular, the invention concerns an apparatus for monitoring constantly a liquid level in a transparent container such as a dropper and producing an alarm when the liquid level has attained a predetermined value. Although not exclusive, the invention is particularly applicable to an apparatus for monitoring the liquid level in a dropper in which a liquid containing medicine and nutritive substances are contained and injected continuously and directly into a blood vessel of a patient, thereby to produce an alarm signal when a lower limit of the liquid level is detected.

Heretofore, the monitoring of the liquid level in the dropper of the above kind has relied on the care and attention of an attendant or nurse attending a patient. It is essentially important to replace a fresh dropper container when the liquid level in the dropper container now being used has attained an allowable minimum level. Otherwise, there would arise a danger that air might be injected into the blood vessel of the patient. Thus, heavy burden is imposed on the nurse and attendant for monitoring the liquid level in the dropper container.

SUMMARY OF THE INVENTION

Accordingly, an important object of the invention is to provide an apparatus for monitoring continuously a liquid level and automatically producing an alarm signal upon detection of a predetermined limit value thereof, thereby informing an attendant of the prevailing situation.

Another object of the invention is to provide an apparatus for monitoring the liquid level in a dropper container and automatically producing an alarm in response to detection of a predetermined limit value thereof, thereby to signal to an attendant that the liquid in the dropper is about to be exhausted and therefore to be replaced by a new one or alternatively the injection is to be stopped.

Another object of the invention is to provide an automatic liquid level monitoring and alarming apparatus thereby to obviate the burden imposed on the attendant.

In view of the above and other objects which will become more apparent, as description proceeds, there is proposed according to an aspect of the invention an apparatus for monitoring a liquid level in a container which comprises a light emitter element disposed at a height along the outer wall of the liquid container and a light sensitive element disposed in opposition to the light emitter element at such a height that the light beam emitted from the light emitter element will impinge on the light sensitive element when the liquid level in the container has attained a predetermined liquid level, whereby the variation in the output state of the light sensitive element is utilized for producing an alarm signal.

Although the invention is particularly suited for monitoring the liquid level in a dropper container for supplying medicine and nutritive substances in liquid phase or in suspension, the invention is equally applicable to the monitoring of the fluid level in a petroleum container, water tank or the like.

The above and other objects, novel features and advantages of the invention will become more apparent from the description of preferred embodiments of the invention. The description makes reference to the accompanying drawings.

DETAILED DESCRIPTION OF THE PREFERRED EMBODIMENTS

Figure 1:
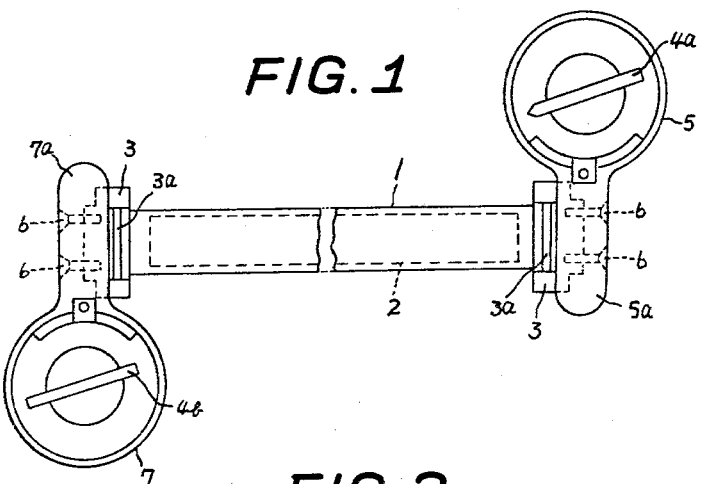
FIG. 1 is a side view showing schematically an arrangement of a liquid level monitoring and alarming apparatus according to an embodiment of the invention.
Figure 2:
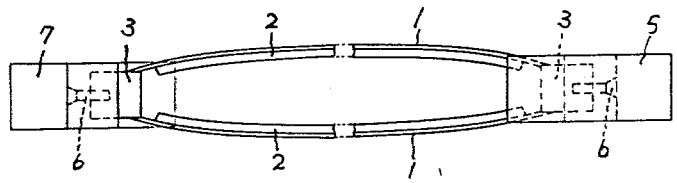
FIG. 2 is a schematic top plan view of the same.

Now, the invention will be described in detail by referring to the drawings. In FIG. 1, reference numeral 1 denotes a pair of leaf springs slightly bent outwardly, each of which is provided with a cussion layer 2 of a resilient material at the inner side thereof. The two sheets of the leaf springs 1 are coupled at both ends thereof to respective connectors 3 by means of pins 3a in such manner that the leaf springs 1 can be considerably bent outwardly away from each other to a substantially circular configuration when the end connectors 3 are enforcively pressed in the opposite direction relative to each other. A light emitter element 4a is disposed in a mounting frame member 5 which in turn is fixedly mounted on one of the connectors 3 at a leg portion 5a thereof. A light sensitive element or photo-detector 4b is disposed in another mounting frame 7 having a leg portion 7a fixedly secured to the other end connector 3 by means of a screw 6. The leg portions 7a and 7b as well as the connectors 3 are so constructed that the leg portions can be removably mounted at the opposite positions. Further, angular positions of the light emitter element 4a and the light sensor element 4b can be arbitrarily changed. In the fully expanded state of the leaf springs 1, the liquid level detector can be mounted around a liquid container such as a transparent dropper container.

Figure 3:
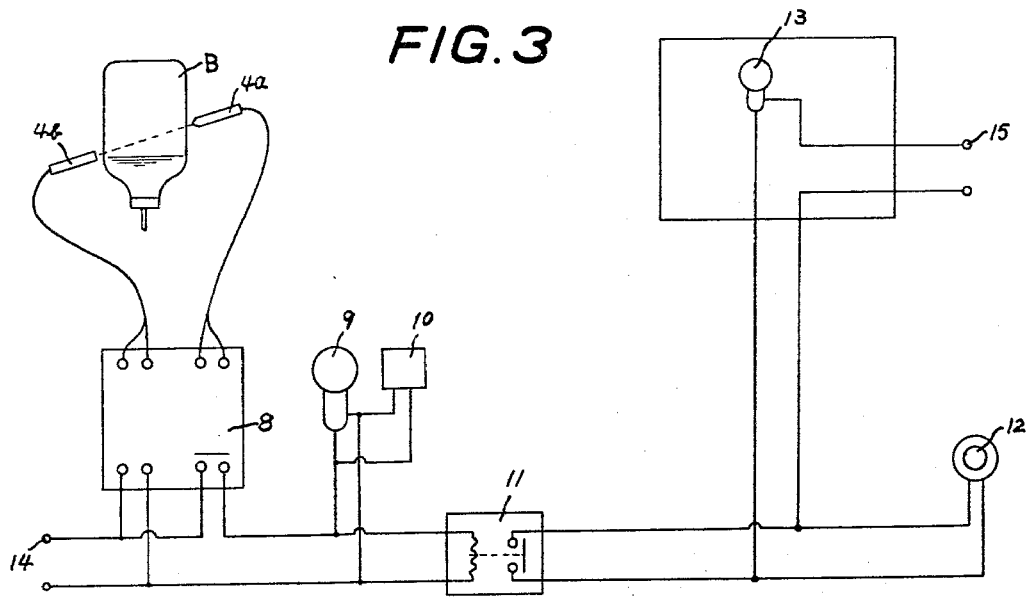
FIG. 3 is a circuit diagram showing a general arrangement of an electric circuit to be used in combination of the liquid level monitoring and alarming apparatus according to the invention.

In FIG. 3 which is a circuit diagram of an electrical circuit for use in the liquid level monitoring apparatus according to the invention, the light emitter element 4a is connected to a power source 14 through a relay device 8 while the photo-detector element 4b is also connected to the power supply source 14 through a normally open contact of a relay of the relay device 8 so that the normally open contact of the relay is closed upon impingement of light on the photo-sensor or detector 4b. A parallel connection of an alarming lamp 9 and an alarming buzzer 10 is connected to the power supply source 14 through the normally open contact of the relay adapted to be energized by the photo-sensor 4b. Of course, it is not always necessary to provide both of the alarming lamp and the alarm buzzer, either one of which may be spared. As will be readily appreciated, when the photo-sensor 4b receives the light beam from the light emitter element 4a, the normally open contact of the associated relay provided in the relay device 8 is closed, as the result of which the alarming lamp 9 and-/or buzzer 10 is supplied with electric energy.

Connected to the power supply 14 is also a second relay 11 having a normally open contact through which a call lamp 13 is connected to a separate power source 15. The relay coil of the relay 11 is connected to the power source 14 through the normally open contact of the relay device 8. Thus, it is apparent that the call lamp 13 energized simultaneously with the energization of the alarming lamp 9 and/or buzzer 10. Such call lamp 13 may be located in an office room of attendants or nurses. Additionally, a push-button switch 12 is connected in parallel with the relay 11 so that the call lamp 13 may be lit only by pressing the push-button switch 12 even when the relay 11 has been energized.

Figure 4:
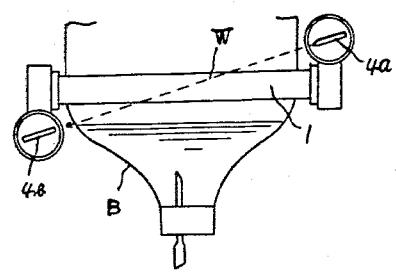
FIGS. 4 to 6 illustrate manners in which the liquid level monitoring apparatus according to the invention can be practically employed.
Figure 4A:
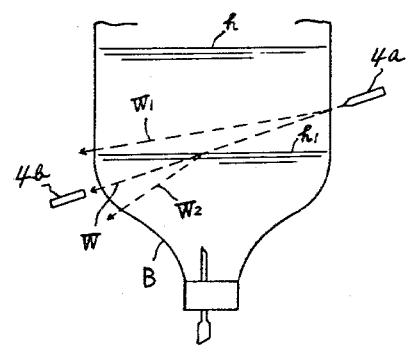

Referring to FIG. 4, there is illustrated a manner in which the liquid level monitor apparatus of the structure described above is used. By way of example, it is assumed that the apparatus is employed for monitoring a liquid level in a transparent dropper container B. The light emitter element 4a and the photo-sensor element 4b are disposed at opposite sides of the dropper container B at different heights so that the light beam from the light emitter element 4a will impinge on the photo-sensor 4b along a slant beam path inclined relative to the longitudinal axis of the dropper container B as indicated by a broken line W. With such arrangement, when the liquid level is at a height h as shown in FIG. 4a, then the light beam from the light emitter element 4a will be refracted as indicated by a broken line W1 due to the refraction index of the liquid and will not impinge onto the photo-sensor 4b. At a liquid level $h_1$ lower than the height h, the light beam will then be refracted downwardly at the liquid surface as indicated by a broken line W2 and is not sensed by the photo-sensor 4b. On the other hand, when the liquid level has been lowered to a point at which the photo-sensor 4b can receive the light beam directly from the light emitter element 4a, as shown in FIG. 4, then the output signal is produced from the former, as the result of which the normally open contact of the relay device 8 will be closed, whereby the alarm lamp 9 and/or the buzzer 10 will be energized to signal that the liquid in the dropper container B is of a small amount and the dropper container is to be replaced and so forth. During the lowering of the liquid level to the height of the photo-sensor 4b, the light beam will temporarily impinge on the sensor 4b. However, this results merely in an instantaneous short duration of energization of the alarming means such as the lamp 9 which can be discriminated from the true alarming state. Of course, such transient energization of the lamp 9 or buzzer 10 may be utilized as a preceding warning signal. It should be mentioned that the liquid in the container B may be transparent or opaque in the above described case of application.

Figure 5:
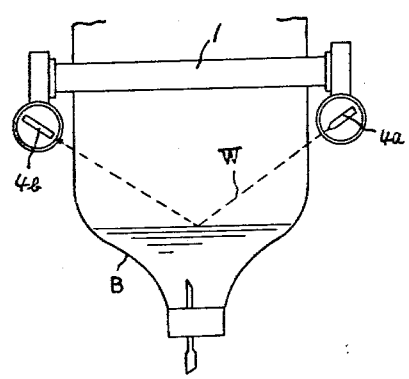
Figure 5A:

In the case of a transparent liquid, other arrangement of the photo-sensor element 4b and the light emitter element 4a is possible, as is illustrated in FIG. 5. In this case, these elements 4a and 4b are disposed such that the photo-sensor 4b can receive only the light beam reflected at the liquid surface of the level at which the alarming signal is to be produced. For example, when the liquid level is at a height higher than the level at which the alarm is produced, the light beam reflected at the liquid surface will not impinge onto the photo-sensor 4b (refer to FIG. 5a).

Figure 6:
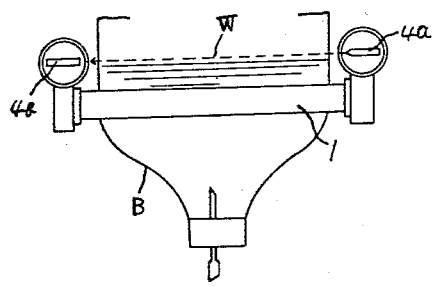

FIG. 6 illustrates another arrangement of the light emitter element 4a and the photo-sensor 4b in the case in which the liquid is opaque. The light emitter element 4a and the photo-sensor 4b are disposed in opposition to each other at the same height corresponding to the level which is to be detected. It will be readily appreciated that the alarm lamp 9 and the buzzer 10 are triggered when the liquid level becomes lower than the height at which the elements 4a and 4b are positioned, thereby to signal that the quantity of liquid remaining in the container B has attained a critical value.

Referring again to FIG. 3, it will be recalled that the normally open contact of the relay 11 is closed simultaneously with the energization of the alarm lamp 9 and the buzzer 10. Thus, the attendant or patient can inform the prevailing critical state to the nurses in the control or office room by merely pressing the call button switch 12 which energizes the call indication lamp 13 installed in the control room.

Figure 7:
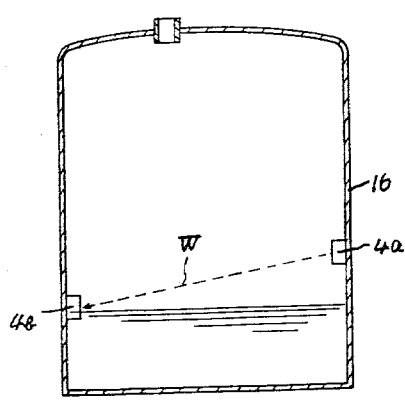
FIG. 7 is a schematic side view to illustrate other application of the liquid level monitoring apparatus according to the invention.

FIG. 7 shows another application of the liquid level monitor apparatus according to the invention. In this case, the light emitter element 4a and the photo-sensor 4b are disposed within a petroleum storage container 16 with the photo-sensor element 4b being positioned at a height corresponding to the level of petroleum which is to be detected, while the light emitter element 4a is located at a higher position than that of the photo-sensor element 4b. It will be readily understood that the photo-sensor 4b will produce an output signal when the level of stored petroleum becomes lowered to the level at which the light beam from the light emitter element 4a can directly impinge onto the photo-sensor 4b. Such output signal can be utilized for producing an appropriate alarm signal.

As will be appreciated from the foregoing description, the invention has provided a convenient liquid level monitoring or detecting apparatus in which the level to be detected can be easily and arbitrarily selected merely by selecting the positions of the photo-sensor and/or the light emitter. When the level monitor apparatus according to the invention is used for monitoring the liquid level in a dropper container at hospitals, the burden imposed on the nurses and attendants can be significantly reduced.

What is claimed is:

1. An apparatus for monitoring a liquid level in an upstanding light-transmissive container containing a liquid, comprising a light emitter element and a light sensitive photo-electrical element disposed on a peripheral wall of said container in opposition to each other, clamping means for mounting said elements on said container, a relay coupled to the output of said light sensitive photo-electrical element and, having a normally open contact, and alarming means coupled to a power supply source through said normally open contact of said relay, in which said alarming means is energized in response to the output signal from said light sensitive element which signal causes said normally open contact of said relay to be closed, and said light emitter element and said light sensitive photo-electrical element are disposed at different heights of said container so that a light beam produced from said light emitter element is directed to said photo-electrical element along a straight path inclined relative to a longitudinal vertical axis of said upstanding container in which upon lowering of said liquid level in said container to a level at which said light beam does not intersect said liquid surface, said light sensitive element produces said output signal to assure detection of said liquid level with reference to a predetermined position along said vertical longitudinal axis of said container regardless of whether said liquid is transparent, translucent or opaque.

2. The apparatus as recited in claim 1 further comprises a relay switch which being energized simultaneously with the energization of the alarms means and a second alarm means connected with said relay switch so that said second alarm means is energized upon the energization of said relay switch.

3. The apparatus as recited in claim 2, wherein second alarm means is connected to a separate power supply source through said relay switch and a push button switch so that said second alarm means is energized by closing said push button switch after the energization of said relay switch.

4. The apparatus as recited in claim 3, in which said second alarm means is remotely located at a central control room.

5. The apparatus as recited in claim 1 in which when the liquid level is at a height higher than the level at which the alarm is produced the light beam reflected at the liquid surface does not impinge on to said photo-electrical element.

6. In an apparatus for monitoring a liquid level in an upstanding light-transmissive container, having a light emitter element and a light sensitive photo electrical element disposed on a peripheral wall of the container in opposition to each other; and alarming means responsive to the output of said photo-electrical element, wherein the improvement comprises;

means for positioning said light emitter element and said photo-electrical elements at different heights of said container so that a light beam produced from said light emitter element is directed to said photo-electrical element along a straight path inclined relative to the longitudinal vertical axis of said container, in which upon lowering of the liquid level in the container to a level at which said light beam does not intersect said liquid surface, and said photo-electrical element produces said output signal to assure detection of the liquid level with reference to a predetermined position along a vertical longitudinal axis of the container.

* * * * *